Dec. 13, 1938.  G. DE CROCE  2,140,351
ELECTRICAL CONTROL SYSTEM
Filed July 25, 1934
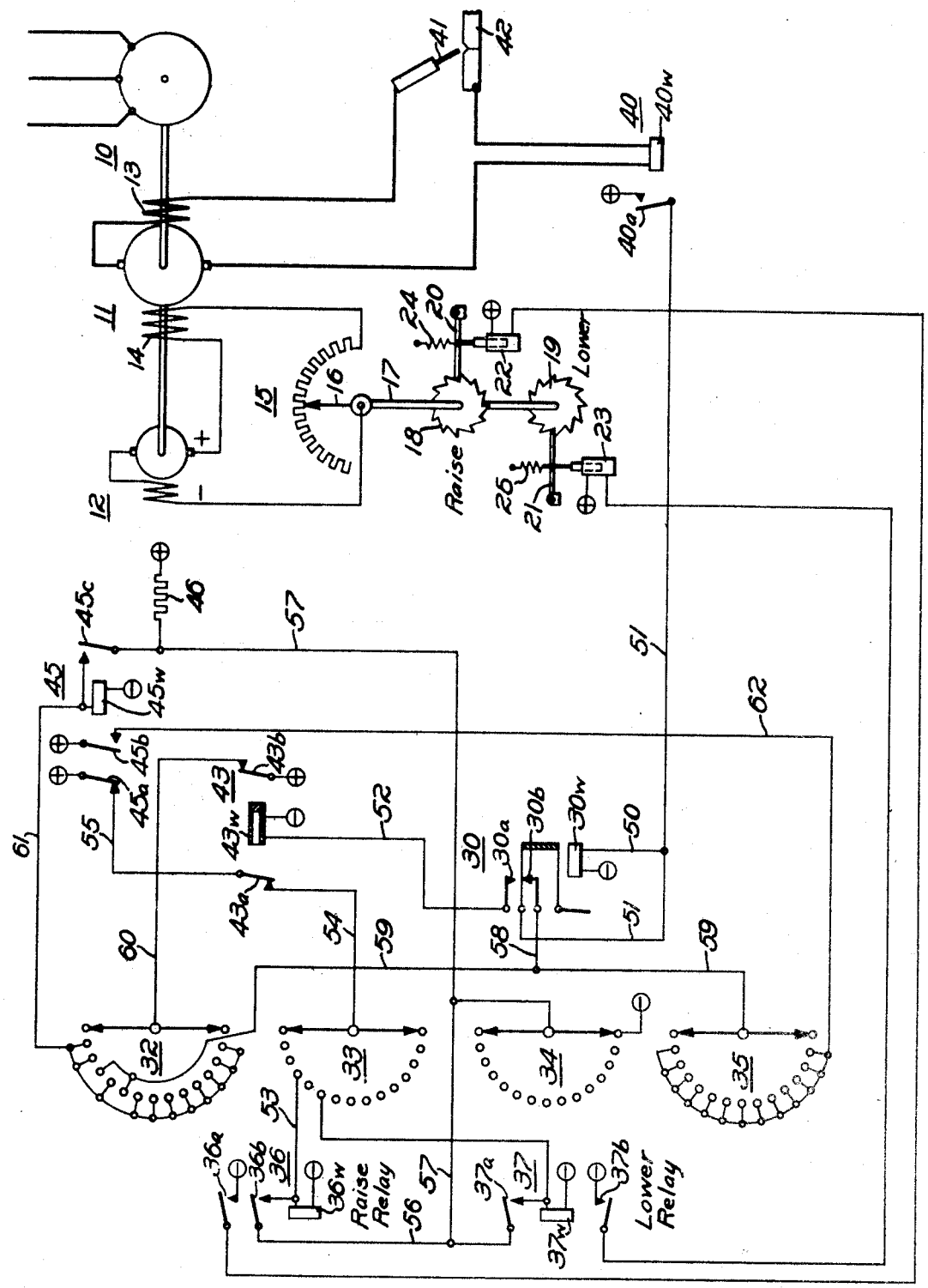
WITNESSES:
P. J. Fitzgerald
R. R. Lockwood
INVENTOR
Gennero De Croce.
BY
ATTORNEY Patented Dec. 13, 1938

2,140,351

UNITED STATES PATENT OFFICE 2,140,351

ELECTRICAL CONTROL SYSTEM

Gennero De Croce, Wilkinsburg, Pa., assignor to Westinghouse Electric & Manufacturing Company, East Pittsburgh, Pa., a corporation of Pennsylvania Application July 25, 1934, Serial No. 736,893

13 Claims. (Cl. 171—229)

My invention relates, generally, to electrical control systems and it has particular relation to systems for remotely adjusting or controlling the output capacity of an electric generator.

Ordinarily, the output capacity of an electric generator is adjusted by varying certain of the field conditions. It is the customary and usual practice to provide a rheostat connected in series circuit relation with one of the field windings for the purpose of controlling the current flow therethrough in order to correspondingly vary the output capacity of the generator. In many instances, it is desirable to adjust the output capacity of the generator from a remote point, since it is often not convenient to install the generator in close proximity to the point where its output is to be used.

In particular, when a welding generator is employed it is especially desirable to be able to remotely adjust its output capacity. It is often inconvenient for the operator to return to the generator to make the desired adjustment. This is especially true when the generator is located on one floor of a building and the operator is working on a floor which is removed from the generator a considerable distance.

It is well known that it is desirable to change the value of the current which is used for performing the welding operation after it has been initiated and the work on which the welding operation is being performed has been heated. When the operator can readily adjust the output capacity of the generator from the welding position, he can, at will, provide himself with the proper value of current, which is best adapted for performing the particular welding operation.

The object of my invention, generally stated, is to provide a remote control system for an electric generator which shall be simple and efficient in operation and which may be readily and economically manufactured and installed.

The principal object of my invention is to provide for remotely adjusting the output capacity of an electric generator.

Another important object of my invention is to provide for increasing the output capacity of an electric generator by closing and opening the load circuit a predetermined number of times and for decreasing its output by closing and opening the load circuit a different predetermined number of times.

Still another important object of my invention is to provide for rendering a remote control system for an electric generator controlled by code combinations of impulses ineffective to bring about the control function individual to a code combination of impulses until the expiration of an interval after the last impulse is received.

Another object of my invention is to provide for automatically resetting a remote control system for an electric generator controlled by code combinations of impulses after the expiration of an interval after any code combination of impulses has been received.

Still another object of my invention is to provide for automatically resetting a remote control system for an electric generator controlled by code combinations of impulses after the expiration of an interval after any other than a predetermined operating code combination of impulses is received.

Other objects of my invention will in part be obvious and in part appear hereinafter.

My invention accordingly is disclosed in the embodiment hereof shown in the accompanying drawing and comprises the features of construction, combination of elements and arrangement of parts which will be exemplified in the construction hereinafter set forth, the scope of the application of which will be indicated in the appended claims.

For a more complete understanding of the nature and scope of my invention, reference may be had to the following detailed description, taken in connection with the accompanying drawing, in which the single figure represents diagrammatically one concrete embodiment of my invention.

According to my invention I provide a rheostat connected in series circuit relation with the main field winding of an electric generator which, as set forth hereinbefore may be a welding generator. The rheostat is provided with raise electro-responsive means for operating it to decrease the resistance in series circuit relation with the field winding of the generator for correspondingly increasing its output capacity and lower electro-responsive means for increasing the resistance in series circuit relation with the field winding of the generator to decrease its output capacity. A selector switch is provided having a plurality of positions, two of which are individual to the raise and lower electro-responsive mechanisms associated with the field rheostat. The selector switch is arranged to be stepped, on the closing and opening of the load circuit of the generator, to any position including the two operating positions.

It will then be understood that if the operator desires to increase the output capacity of the generator, he closes and opens the load circuit of the generator a predetermined number of times, in this embodiment of the invention three times, to operate the raise electro-responsive means for correspondingly operating the field rheostat.

In the event that the operator wishes to decrease the output capacity of the generator, he closes and opens the load circuit a predetermined number of times, in this embodiment of the invention five times, to effect the operation of the lower electro-responsive means to correspondingly operate the field rheostat to decrease the output capacity of the generator. After either a raise or a lower operation has been completed, the selector switch is automatically restored to a normal position.

In the event that the load circuit is closed and opened for any number of times other than the two before mentioned predetermined numbers, i. e. three or five, and no further closing and opening of the load circuit takes place, the selector switch will be automatically restored to a normal position. This functioning is effected by providing a relay, the dropout time of which is a relatively long interval. If the load circuit is not again closed and opened within the time interval required for the relay to drop out, the system is automatically restored to the normal position.

Referring now particularly to the single figure of the drawing, the reference character 10 designates, generally, an electric motor which may be provided for driving a direct current generator, shown generally at 11, and an exciter generator, shown generally at 12, of the series type. The generator 11 may be of the differential compound wound type having a differential series field winding 13 and a main field winding 14. It will be understood that any other suitable type of driving means may be provided instead of the motor 10 and also that other types of generators 11 may be employed as well as other types of exciter generators 12.

The exciter generator 12 is provided primarily to supply excitation current for the main field winding 14. In order to regulate or control the flow of current through the main field winding 14, a rheostat shown generally at 15 is provided and is resistance element is connected in series circuit relation with the main field winding 14.

While the generator 11 has been illustrated in this embodiment of the invention as being regulated by means of a rheostat 15, it will be understood that other types of regulation may be employed for the generator 11 without departing from the scope of this invention. Thus, any of the various mechanical means may be provided for moving a magnetic member within the generator 11 for the purpose of altering the field flux paths thereof to effect the desired control. It will, therefore, be understood that the rheostat 15 is shown herein merely for illustrative purposes.

It will be observed that the rheostat 15 is provided with a contact arm 16 which may be mounted on a shaft 17. The shaft 17 has secured thereto oppositely disposed ratchet wheels 18 and 19 with which pawls 20 and 21 respectively, are disposed to engage. A raise operating winding 22 is provided for operating the pawl 20 to engage the ratchet wheel 18 for turning the operating arm 16 in a clockwise direction to decrease the resistance connected in series circuit relation with the main field winding 14. In like manner, a lower operating winding 23 is provided for operating the pawl 21 to engage the ratchet wheel 19 for turning the operating arm 16 in a counter-clockwise direction to increase the resistance connected in series circuit relation with the main field winding 14. Springs 24 and 25 are provided, as illustrated, for retrieving the pawls 20 and 21, respectively.

While a pawl and ratchet mechanism has been illustrated and described as being provided for operating the rheostat 15, it will be understood that other devices may be employed, such for example, as a motor-operated mechanism. A corresponding functioning may be obtained by operating a motor connected to drive the operating arm 16 in either a forward or a reverse direction. Since operating mechanisms of this general nature are well known to those skilled in the art, and further, since the particular mechanism for operating the rheostat 15 forms no part of this invention, it has been deemed unnecessary to illustrate and describe the motor-operated mechanism in detail.

In order to render the system selectively responsive to the closing and the opening of the load circuit of the generator 11 for different predetermined numbers of times to effect the desired operation of the rheostat 15, a selector switch shown generally at 30 and having an operating winding 30w is provided. The selector switch 30 is of the type which is commonly used in telephone practice. When the operating winding 30w is energized, a pawl is withdrawn against the force of a spring. When the operating winding 30w is deenergized, the pawl is released and under the influence of the spring, the wipers individual to the different banks of contact members are stepped from one position to the next succeeding position. At the same time that the operating winding 30w is energized, the front contact members 30a are closed and the back contact members 30b are opened. Since the construction and functioning of selector switch 30 is well known to those skilled in the art, and further, since its specific construction forms no part of this invention, it has been illustrated diagrammatically only in the usual manner.

The selector switch 30 is provided with four banks of contact members which include a transfer bank 32, a control bank 33, a reset bank 34 and a stepping bank 35. The transfer bank 32 is provided for transferring the functioning of the system from a non-operating position to an operating position and to restore the system to a normal position, which is that in which the selector switch 30 is illustrated, on the completion of one of the predetermined control functions. The control bank 33 is provided for effecting the desired functioning of the system depending upon the number of impulses which have been received. After the selector switch 30 has been restored to the normal position, the last contact member of the reset bank 34 restores the relays which have been energized to the deenergized position. After the expiration of an interval after any function has been completed, the stepping bank 35 serves to restore the selector switch 30 to the normal position.

In view of the fact that the contact members and wiper of the control bank 33 ordinarily are not sufficiently rugged to directly carry the current which is necessary for energizing the raise and lower windings 22 and 23, a raise relay 36, having an operating winding 36w, and a lower relay 37, having an operating winding 37w, are provided. It will be observed that the raise and lower relays 36 and 37 are individual, respectively, to the fourth and sixth contact members of the control bank 33. When the wiper of the control bank 33 has remained on either of these positions for a predetermined length of time, a circuit is completed, which will be hereinafter set forth, for energizing either the raise or the lower relay, as the case may be.

The functioning of the selector switch 30 is controlled by means of an impulse relay 40, having an operating winding 40w, which may be connected in series circuit relation with the load circuit of the generator 11. The impulse relay 40 is provided with contact members 40a which, when completed, serve to complete an energizing circuit for the operating winding 30w of the selector switch 30. While it is preferable to provide the impulse relay 40 in the load circuit of the generator 11, it will be readily apparent that the operating winding 30w of the selector switch 30 could be connected directly in the load circuit. Due to the desire to use standard apparatus, however, the selector switch 30 is provided with a standard operating winding 30w and the impulse relay is especially designed to operate over the wide range of current values which are obtainable from the generator 11 when the rheostat 15 is in different positions.

As set forth hereinbefore, the generator 11 may be arranged to supply current to a load in the form of a welding arc. The welding arc may be maintained between the welding electrode 41 and work 42 on which the welding operation is to be performed in the customary manner. Thus, in order to operate the impulse relay 40, the operator merely needs to move the welding electrode 41 into contact engagement with the work 42 for the number of times which it is necessary to effect the desired control.

It is necessary to differentiate between impulses which are received by the selector switch 30 due to the normal closing and opening of the load circuit, in this instance striking the arc, and the impulses which are received by the selector switch 30, as the result of the deliberate act of the operator closing and opening the load circuit for the predetermined number of times to effect a predetermined operation of the rheostat 15. For this purpose, a control relay, shown generally at 43, is provided which is arranged to be energized as soon as the first impulse is received.

The control relay 43 is of the type which is known to those skilled in the art as a slow-to-deenergize or drop out relay. This operating characteristic is obtained by providing a copper sleeve around the operating winding 43w and in addition providing a copper slug at one end thereof. The eddy currents flowing in the copper sleeve and slug after the operating winding 43w is deenergized are sufficient to maintain the relay in the operated position for an appreciable interval after the operating winding 43w is deenergized. It is this time delay which controls the next step in the operation of the system. Thus, if the selector switch 30 is stepped to any position other than the fourth or the sixth position, it will be automatically restored to the normal position when the control relay 43 drops. On the other hand, if the selector switch 30 is stepped to either the fourth or the sixth position, either the raise or the lower relay 36 or 37 will be pulled when the control relay 43 drops.

In addition to initiating the operation of either the raise or the lower relay 36 or 37, the control relay 43 also serves to pull a restoring relay, shown generally at 45, which serves to then restore the selector switch 30 to the normal position. The pulling of the restoring relay 45 completes a circuit for automatically stepping the selector switch 30 back to the normal position.

When either the raise or the lower relay 36 or 37 is pulled and the restoring relay 45 is pulled, circuits are completed through a resistor 46 for holding these relays pulled. They are shunted down by the wiper of the reset bank 34 which serves to connect the same potential to both terminals of the relay windings thereby deenergizing them.

In describing the operation of the system, it will be assumed that the generator 11 is being driven by the motor 10 and that the exciter generator 12 is applying suitable excitation current for the main field winding 14. In order to reduce the number of conductors illustrated in the drawing to a minimum, symbols are used for indicating when the various elements of the control system are connected to either a positive or a negative voltage. Thus the negative sign surrounded by a circle indicates a connection to the negative terminal of a direct current source while the positive sign surrounded by a circle indicates the positive terminal of the direct current source. It will be understood that the direct current source may either be a storage battery or it may be the exciter generator 12. Throughout the description when either of the terminals of the direct current source are referred to, they will be referred to as positive or negative, as the case may be.

It will further be assumed that the operator wishes to increase the output capacity of the generator 11 by operating the field rheostat 15 to decrease the resistance connected in series circuit relation with the main field winding 14. Therefore, the operator closes and opens the load circuit of the generator 11 by tapping the welding electrode 41 on the work 42 three times in fairly quick succession. As soon as the load circuit of the generator 11 is completed the first time, the impulse relay 40 is pulled and completes a circuit for energizing the operating winding 30w of the selector switch and also for pulling the control relay 43.

The circuit for energizing the operating winding 30w may be traced from negative through the operating winding 30w, conductors 50 and 51 and front contact members 40a to positive. The circuit for pulling the control relay 43 may be traced from negative through the operating winding 43w, conductor 52, front contact members 30a, conductor 51 and front contact members 46a to positive.

The succession of signals resulting from the closing and opening of the load circuit of the generator 11 provides what may be termed a code combination of impulses which is effective successively to pull and drop the impulse relay 40. Thus, when the operator closes and opens the load circuit three times in succession, the impulse relay 40 will correspondingly be pulled and dropped three times. However, the control relay 43 will remain pulled since it is slow to drop out, provided the operator again closes and opens the load circuit within the time limit of the control relay 43, as will be readily understood. Three successive energizations and deenergizations of the operating winding 30w of the selector switch 30 step the wipers thereof to the fourth position. No further impulsing by the operator taking place, the control relay 43 drops to complete a circuit for pulling the raise relay 36.

The circuit for pulling the raise relay 36 may be traced from negative through winding 36w, conductor 53, fourth set of contact members and the wiper on the control bank 33, conductor 54, back contact members 43a, conductor 55, and back contact members 45a, to positive.

The raise relay 36 at contact members 36a completes an obvious circuit for energizing the raise winding 22. As a result, the pawl 20 is pulled downwardly to rotate the ratchet wheel 18 in a clockwise direction to rotate the contact arm 16 in the same direction. The resistance, connected in series circuit relation with the main field winding 14, will then be reduced and the output capacity of the generator 11 will be correspondingly increased.

The raise relay 36 on pulling completes a circuit for holding itself pulled, which may be traced as follows: negative, through winding 36w, front contact members 36b, conductors 56 and 57, and resistor 46, to positive.

The dropping of the control relay 43 also completes a circuit for stepping the selector switch 30 off of the fourth point by completing a circuit for energizing the operating winding 30w. This circuit may be traced as follows: negative, through operating winding 30w, conductors 50 and 51, back contact members 30b, conductors 58 and 59, fourth set of contact members and the wiper of the transfer bank 32, conductor 60 and back contact members 43b, to positive.

The selector switch 30 is then stepped to the fifth point due to the fact that the energization of the operating winding 30w opens the back contact members 30b and thereby opens the energizing circuit for the winding 30w. A circuit is then completed for pulling the restoring relay 45 to return the selector switch to the normal position. The circuit for energizing the winding 45w of the restoring relay 45 may be traced as follows: negative, through operating winding 45w, conductor 61, fifth set of contact members and the wiper of the transfer bank 32, conductor 60, and back contact members 43b to positive. The pulling of the restoring relay 45 completes at its front contact members 45c an obvious holding circuit for the operating winding 45w. At contact members 45a, the energizing circuit for the operating winding 36w is opened. However, this relay is held pulled over a circuit which has previously been traced through the resistor 46.

At contact members 45b, a circuit is completed through stepping bank 35 to automatically step the selector switch 30 back to the normal position. Due to the fact that the restoring relay 45 is held pulled over the circuit through its front contact members 45c, this circuit is maintained until the selector switch 30 is restored to the normal position.

The circuit for stepping the selector switch 30 may be traced as follows: negative, through operating winding 30w, conductors 50 and 51, back contact members 30b, conductors 58 and 59, wiper and any of the contact members of the stepping bank 35 except the first and the last, conductor 62, and front contact members 45b to positive. At contact members 30b, the previously described circuit for energizing the operating winding 30w is opened, as soon as the operating winding 30w is energized, and the selector switch 30 is successively stepped to the normal position.

When the selector switch 30 has been restored to the normal position, the operating windings 36w and 45w are shunted down by applying negative voltage to both terminals by means of the reset bank 34. It will be observed that the last contact member of the reset bank 34 is connected to negative. When the selector switch 30 is restored to the normal position, it will be apparent that negative is applied to both terminals of the operating windings 36w and 45w. Therefore, they will be deenergized and will drop.

It will be observed that the system is responsive to the impulse relay 40 being deenergized for a predetermined length of time. As long as it is energized no further action will ordinarily take place. Thus the selector switch 30 does not reset to the normal position until the expiration of a predetermined time after current ceases to flow in the welding circuit.

In the event that the operator wishes to decrease the output capacity of the generator 11, he taps the electrode 41 on the work 42 to send a code combination of impulses comprising five impulses. In the manner described hereinbefore, the selector switch 30 will be stepped to the sixth position, and the lower relay 37 will be pulled to energize the lower winding 23. Due to the fact that no operation can take place until the control relay 43 drops, the raise relay 36 will not be pulled when the fourth position is reached, unless the operator pauses on this position for a time longer than is required for the control relay 43 to drop out. The energization of the lower winding 23 operates the pawl 21 to rotate the ratchet wheel 19 in a counter-clockwise direction to correspondingly rotate the operating arm 16 to increase the resistance connected in series circuit relation with the main field winding 14.

At contact members 37a, the lower relay 37 completes a holding circuit for itself through the resistor 46 in a manner described hereinbefore. The restoring relay 45 is subsequently pulled and both it and the lower relay 37 are dropped when the selector switch 30 has been restored to the normal position.

When the operator is initially completing the load circuit, such as to strike the welding arc, the impulse relay 40 is, of course, pulled. Normally, not more than two attempts are necessary to strike the arc and thus the code combination of impulses for effecting the operation of the rheostat 15 to raise the output capacity of the generator 11 will not be transmitted. In the event that certain operators require more than two attempts to strike the arc, it will be obvious that the connections to the transfer bank 32 and the control bank 33 may be altered to provide for effecting the operation of the rheostat 15 only after the transmission of a larger number of impulses. Thus five impulses may be used for raising the output capacity of the generator 11 and eight impulses may be used for lowering it. The number of impulses which are required will, of course, be governed by the conditions under which the system is to be operated.

When the operator has transmitted a non-operating code, such, for example, as two impulses and continues to weld, the selector switch 30 remains in the position to which it has been stepped until the welding circuit is opened. At this time, the impulse relay 40 is dropped and the operating winding 30w of the selector switch is deenergized. The control relay 43 which was pulled on reception of the first impulse then drops, and completes at back contact members 43b a circuit over any of the contact members of the transfer bank 32 except the first, fourth, sixth and last for pulling the restoring relay 45. The pulling of the restoring relay 45 completes at its front contact members 45b the circuit through the stepping bank 35 to restore the selector switch 30 to the normal position which has been traced hereinbefore.

Since certain further changes may be made in the above construction and different embodiments in the invention may be made without departing from the scope thereof, it is intended that all matter contained in the above description or shown in the accompanying drawing shall be interpreted as illustrative and not in a limiting sense.

I claim as my invention:

1. A remote control system comprising, in combination, an electric generator, means for increasing or decreasing the output of the generator, means for selectively controlling the operation of the output control means, and means for applying a predetermined number of impulses by closing and opening the load circuit of said generator for immediately operating said last named means to increase the output of the generator and a different predetermined number of impulses to immediately decrease the output of the generator.

2. A remote control system comprising, in combination, an electric generator, means for varying the output of the generator, raise means for operating the output control means to increase the output of the generator, lower means for operating the output control means to decrease the output of the generator, and means selectively responsive to the application of one code combination of like impulses obtained by closing and opening the load circuit of said generator for immediately operating said raise means and of a different code combination of like impulses for immediately operating said lower means.

3. A remote control system comprising, in combination, an electric generator, means for varying the output of the generator, raise means for operating the output control means to increase the output of the generator, lower means for operating the output control means to decrease the output of the generator, a selector switch provided with raise and lower contact means connected respectively to said raise and lower means, and means for operating said selector switch to effect the operation of either the raise or the lower means on application of different code combinations of like impulses obtained by closing and opening the load circuit of said generator.

4. A remote control system comprising, in combination, an electric generator, means for varying the output of the generator, raise means for operating the output control means to increase the output of the generator, lower means for operating the output control means to decrease the output of the generator, a selector switch provided with raise and lower contact means connected respectively to said raise and lower means, means for stepping said selector switch to either the raise or lower position in response to the application of different code combinations of impulses obtained by closing and opening the load circuit of said generator, and means for preventing the operation of said raise or lower means until the expiration of a predetermined interval after the selector switch is stepped to either position.

5. A remote control system comprising, in combination, an electric generator, means for varying the output of the generator, raise means for operating the output control means to increase the output of the generator, lower means for operating the output control means to decrease the output of the generator, a selector switch provided with a plurality of positions including raise and lower positions individual respectively to said raise and lower means, means for stepping the selector switch to any position in response to the application of different code combinations of like impulses obtained by closing and opening the load circuit of said generator, and means for restoring the selector switch to a normal position at the expiration of a predetermined interval after the switch is operated to any position.

6. A remote control system comprising, in combination, an electric generator, means for varying the output of the generator, raise means for operating the output control means to increase the output of the generator, lower means for operating the output control means to decrease the output of the generator, a selector switch provided with a plurality of positions including raise and lower positions individual respectively to said raise and lower means, means for stepping the selector switch to either the raise or the lower position in response to the application of different code combinations of impulses obtained by closing and opening the load circuit of said generator, means for initiating the functioning of either the raise or the lower means at the expiration of a predetermined interval after the selector switch has been stepped to either position, and means for restoring the selector switch to a normal position at the expiration of a predetermined interval after the selector switch is operated to any position.

7. A remote control system comprising, in combination, a direct current generator, a field winding disposed in the generator, a field rheostat connected in series circuit relation with the field winding for varying the output of the generator, raise means for operating the rheostat to increase the output of the generator, lower means for operating the rheostat to decrease the output of the generator, a selector switch provided with a plurality of positions including raise and lower positions individual respectively to said raise and lower means, means for stepping the selector switch to either the raise or the lower position in response to the application of different code combinations of impulses obtained by closing and opening the load circuit of said generator, means for operating the raise or the lower means at the expiration of a predetermined interval after the selector switch has been stepped to either position, and means for restoring the selector switch to a normal position at the expiration of a predetermined interval after the selector switch is operated to any position.

8. A remote control system comprising, in combination, an electric generator and a load circuit therefor, means for controlling the output of the generator, means for controlling the operation of the output control means, and means selectively responsive to the closing and opening of the load circuit for different predetermined numbers of times under like electrical conditions for initiating the functioning of the output control means to increase or decrease the output of the generator.

9. A remote control system comprising, in combination, an electric generator and a load circuit therefor, means for varying the output of the generator, raise means for operating the output control means to increase the output of the generator, lower means for operating the output control means to decrease the output of the generator, and means selectively responsive to the closing and opening of the load circuit in one code combination of like impulses for operating said raise means and in another code combination of like impulses for operating said lower means.

10. A remote control system comprising, in combination, a direct current generator and a load circuit therefor, a field winding disposed in the generator, a field rheostat connected to vary the current flowing through the field winding, raise means for operating the rheostat to increase the output of the generator, lower means for operating the rheostat to decrease the output of the generator, a selector switch provided with raise and lower contact means connected respectively to said raise and lower means, and means responsive to the successive closing of said load circuit for a predetermined number of substantially equal intervals of time for operating said selector switch to effect the operation of either the raise or the lower means.

11. A remote control system comprising, in combination, a direct current generator and a load circuit therefor, a rheostat for controlling the excitation of the generator, raise means for operating the rheostat to increase the output of the generator, lower means for operating the rheostat to decrease the output of the generator, a selector switch provided with raise and lower contact means connected respectively to said raise and lower means, means responsive to the closing and opening of the load circuit for stepping the selector switch to either the raise or lower position, and means for preventing the operation of said raise or lower means until the expiration of a predetermined interval after the selector switch is stepped to either position.

12. A remote control system comprising, in combination, a direct current generator and a load circuit therefor, a field winding disposed in the generator, a field rheostat connected to vary the current flowing through the field winding, raise means for operating the rheostat to increase the output of the generator, lower means for operating the rheostat to decrease the output of the generator, a selector switch provided with a plurality of positions including raise and lower positions individual respectively to said raise and lower means, means responsive to the successive opening of said load circuit during a predetermined number of time intervals each less in length than a predetermined time interval for stepping the selector switch to any position, and means for restoring the selector switch to a normal position at the expiration of a predetermined interval after the switch is operated to any position.

13. A remote control system comprising, in combination, a direct current generator and a load circuit therefor, a field winding disposed in the generator, a field rheostat connected to vary the current flowing through the field winding, raise means for operating the rheostat to increase the output of the generator, lower means for operating the rheostat to decrease the output of the generator, a selector switch provided with a plurality of positions including raise and lower positions individual respectively to said raise and lower means, means responsive to the closing and opening of the load circuit for stepping the selector switch to either the raise or the lower position, means for initiating the functioning of either the raise or the lower means at the expiration of a predetermined interval after the selector switch has been stepped to either position, and means for restoring the selector switch to a normal position at the expiration of a predetermined interval after the selector switch is operated to any position.

GENNERO DE CROCE.